United States Patent
Yeom

(10) Patent No.: US 10,178,552 B2
(45) Date of Patent: Jan. 8, 2019

(54) AUTHENTICATION SYSTEM AND METHOD USING FLASH OF SMART MOBILE

(71) Applicant: Suk Hwan Yeom, Seoul (KR)

(72) Inventor: Suk Hwan Yeom, Seoul (KR)

(73) Assignee: b.plat LLC, Brooklyn, NY (US)

( * ) Notice: Subject to any disclaimer, the term of this patent is extended or adjusted under 35 U.S.C. 154(b) by 0 days.

(21) Appl. No.: 15/573,826

(22) PCT Filed: May 13, 2016

(86) PCT No.: PCT/KR2016/005110
§ 371 (c)(1),
(2) Date: Nov. 13, 2017

(87) PCT Pub. No.: WO2016/182397
PCT Pub. Date: Nov. 17, 2016

(65) Prior Publication Data
US 2018/0262908 A1    Sep. 13, 2018

(30) Foreign Application Priority Data
May 14, 2015 (KR) .......................... 10-2015-0067543

(51) Int. Cl.
*H04W 12/06* (2009.01)
*H04B 10/116* (2013.01)
(Continued)

(52) U.S. Cl.
CPC .......... *H04W 12/06* (2013.01); *H04B 10/116* (2013.01); *H04L 63/0853* (2013.01);
(Continued)

(58) Field of Classification Search
CPC ..... H04W 12/06; H04W 12/12; H04W 88/02; H04W 4/12; H04L 63/08; H04L 29/08108;
(Continued)

(56) References Cited

U.S. PATENT DOCUMENTS

| 2006/0014518 A1* | 1/2006 | Huh | H04M 15/06 455/406 |
| 2006/0095773 A1* | 5/2006 | Itoh | G06F 21/34 713/176 |

(Continued)

FOREIGN PATENT DOCUMENTS

| KR | 1020010068073 | 7/2001 |
| KR | 1020060054532 | 5/2006 |

(Continued)

OTHER PUBLICATIONS

PCT International Application No. PCT/KR2016/005110, International Search Report dated Sep. 8, 2016, 2 pages.

(Continued)

*Primary Examiner* — Danh C Le
(74) *Attorney, Agent, or Firm* — Lee, Hong, Degerman, Kang & Waimey

(57) ABSTRACT

It is capable of authentication by transmitting through light emitted from a flash of a smart mobile according to foregoing solution of the problem, security and stability can be improved in comparison with other authentication systems such as an ID, a password and a public authentication which are necessary to a bank task, a personal authentication, an identity authentication and a transaction remittance. And, even if the smart mobile is lost or a stranger acquiring this are misappropriating, cryptography such as patterns cannot be solved thereby it is not available. Further, carrying is easy to use anywhere regardless of the place because the transaction is available using a flash equipped to the smart mobile.

11 Claims, 3 Drawing Sheets

(51) Int. Cl.
*H04L 29/06* (2006.01)
*H04W 4/12* (2009.01)
*H04M 1/725* (2006.01)

(52) U.S. Cl.
CPC ......... *H04L 63/18* (2013.01); *H04M 1/72519* (2013.01); *H04M 1/72522* (2013.01); *H04W 4/12* (2013.01)

(58) Field of Classification Search
CPC ............ H04L 29/08756; H04L 9/3281; H04M 1/72519; H04M 1/72522; H04N 21/8358; H04N 1/32144
USPC .................. 455/411, 410, 418, 550.1, 414.4; 713/176
See application file for complete search history.

(56) References Cited

U.S. PATENT DOCUMENTS

| | | | |
|---|---|---|---|
| 2008/0248248 A1* | 10/2008 | Caine | G06F 1/1616 428/152 |
| 2008/0248836 A1* | 10/2008 | Caine | G06F 1/1616 455/566 |
| 2008/0287167 A1* | 11/2008 | Caine | G06F 1/1616 455/575.1 |
| 2009/0128376 A1* | 5/2009 | Caine | H04M 1/23 341/34 |
| 2012/0054046 A1 | 3/2012 | Albisu | |
| 2013/0009036 A1 | 1/2013 | Yianni et al. | |
| 2014/0118233 A1 | 5/2014 | Mahowald | |

FOREIGN PATENT DOCUMENTS

| | | |
|---|---|---|
| KR | 1020070082169 | 8/2007 |
| KR | 101260698 | 4/2013 |
| WO | 2015052606 | 4/2015 |

OTHER PUBLICATIONS

Korean Intellectual Property Office Application No. 10-2015-0067543, Office Action dated Jul. 19, 2017, 4 pages.

* cited by examiner

[Fig. 1]
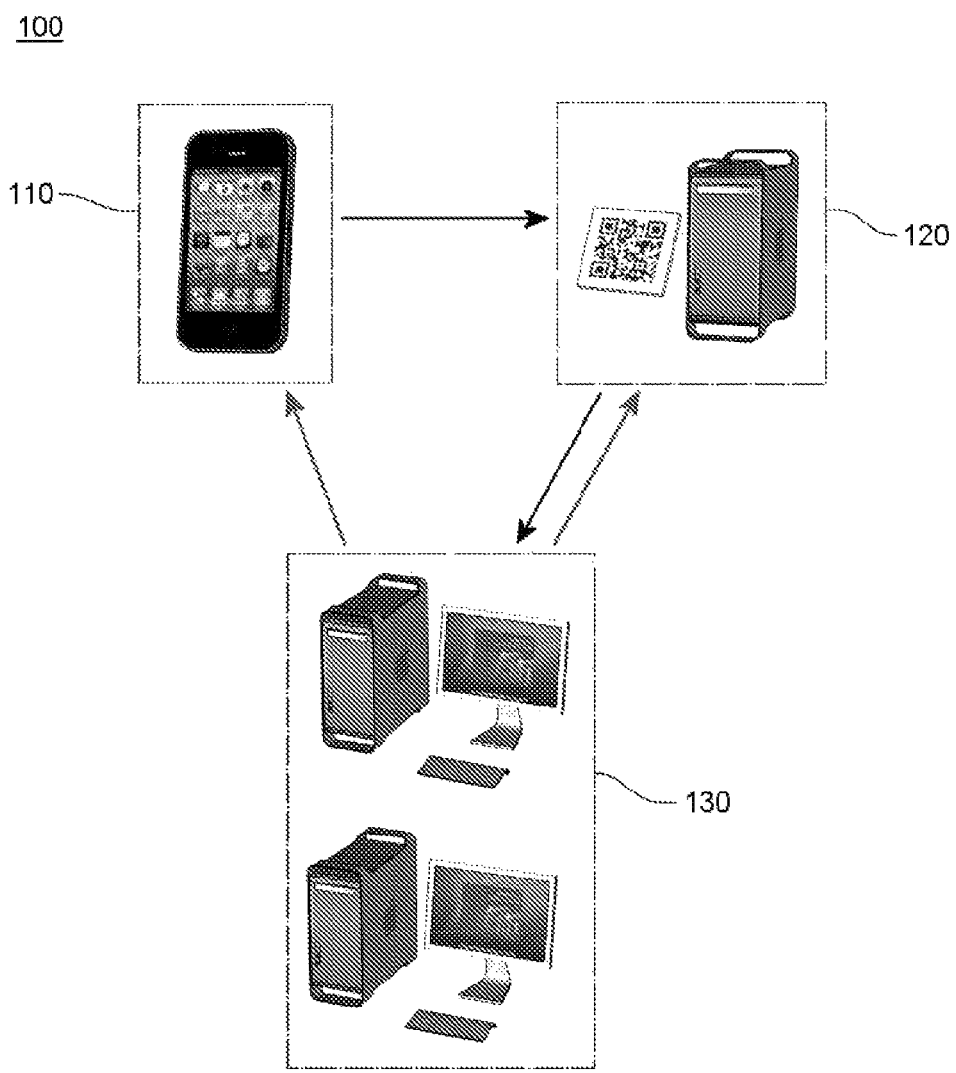

[Fig. 2]
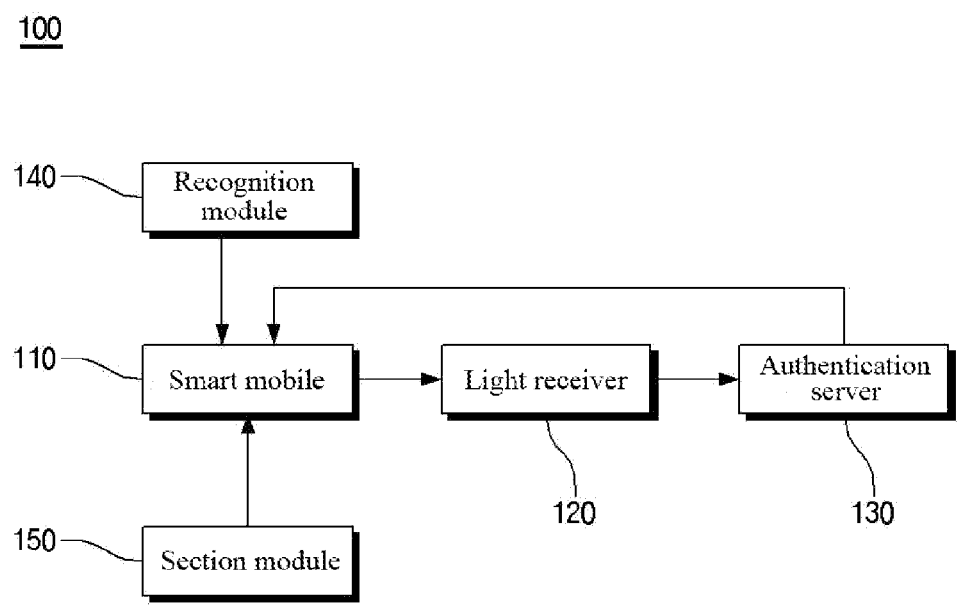

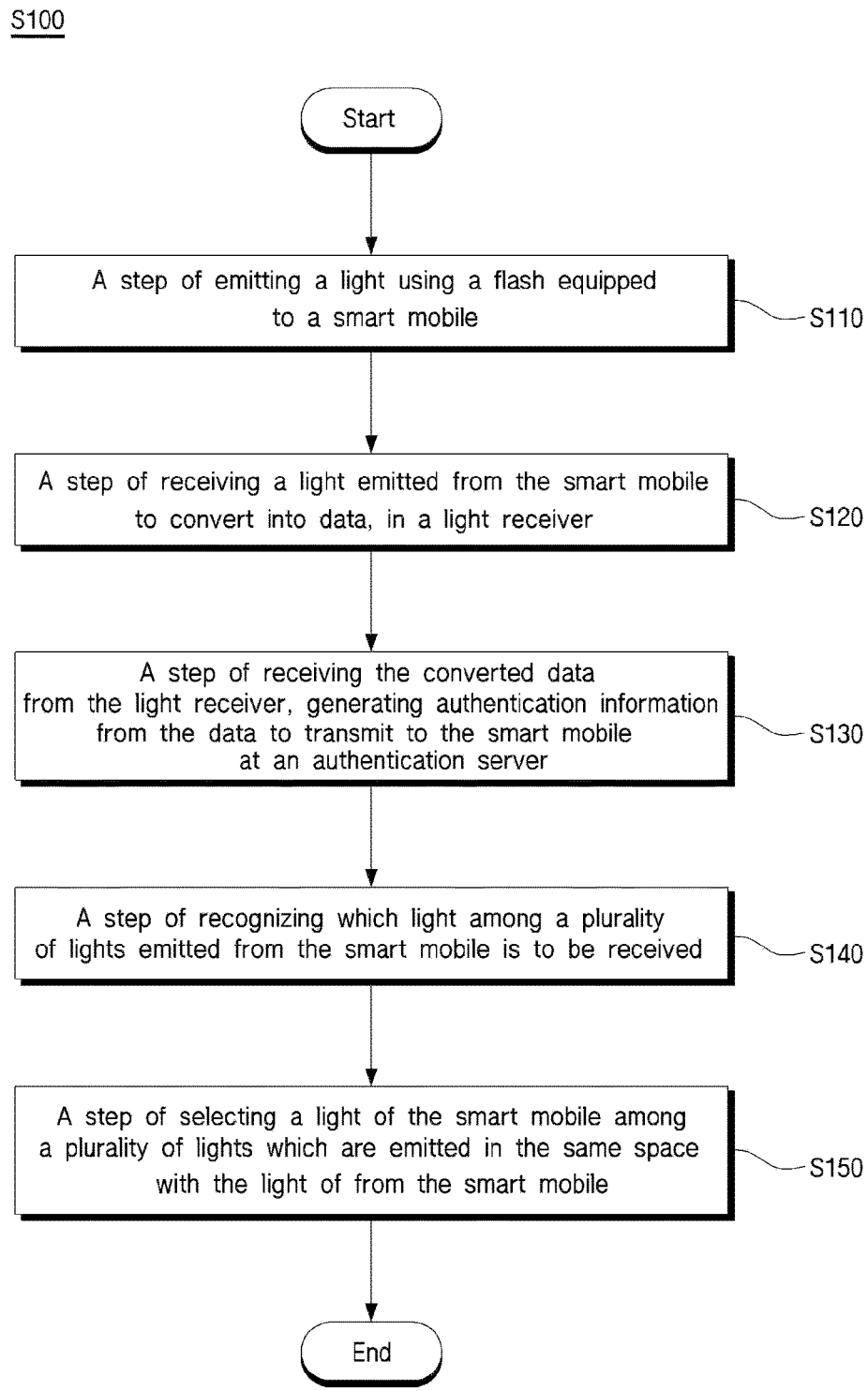

AUTHENTICATION SYSTEM AND METHOD USING FLASH OF SMART MOBILE

CROSS-REFERENCE TO RELATED APPLICATIONS

This application is the National Stage filing under 35 U.S.C. 371 of International Application No. PCT/KR2016/005110, filed on May 13, 2016, which claims the benefit of earlier filing date and right of priority to Korean Application No. 10-2015-0067543, filed on May 14, 2015, the contents of which are all hereby incorporated by reference herein in its entirety.

TECHNICAL FIELD

The present invention relates to an authentication system and method using a flash of a smart mobile, and more specifically relates to an authentication system and method using a flash of a smart mobile capable of authentication by transmitting data through light emitted from a flash of a smart mobile, thereby enhancing security and safety in comparison with other authentication systems such as ID, password, official certification, OTP and so on.

BACKGROUND ART

In general, a conventional charge settlement method of a commercial transaction which is implemented for purchasing or selling a merchandise has been mostly performed by cash or a credit card possessed by an user. In case of using a credit card, the user presents a credit card after purchasing a merchandise or receiving a service, and then a store requests and receiving an approval to/from a transaction server using an inquiry terminal installed thereof.

However, the credit card which should be possessed for using this transaction is easy to be frequently lost, the fact of losing is not aware easily because it is used in large amount transaction more than dozens of thousands won rather than small amount transaction the such that the frequency of use is low when it was lost, thereby it is frequent that the lost credit card is used in a malicious transaction such as an unlawful transaction in real state during without recognition of losing.

And, since the credit card accompanies a commercial transaction according to information stored by a magnetic strip method, it is weak to forgery and alteration, thereby damages more than dozens of million won are occurred by forged and altered credit card.

Even if not the above losing or forgery and alteration, the credit card number and the term of validity is sufficient for transaction for purchasing a merchandise at present when shopping through Internet is a daily work, and these information is easily exposed from an online shopping mall or a store during transaction by the credit card, thereby cases of taking unlawful profit in an Internet shopping mall are frequently occurred by using these information maliciously and damages are increasing in the real state.

In this reasons, a purchaser possessing a credit card does not trust the Internet shopping mall to dislike providing their credit card. Thus there is inconvenience that needlessly large amount of money should be possessed, or large amount of time should be spent for purchasing necessary merchandise because purchase through communication network is not considered. It is a real state that these problems are obstacles to progress toward a credit society.

Relative prior art is Korean registered patent No. 10-1260698 (Method and system for call authentication using terminal information, Registered date: Apr. 29, 2013) and Korean Patent Publication No. 10-2001-0068073 (System and method for transaction by using communication terminals, Publication date: Jul. 13, 2001)

DISCLOSURE OF INVENTION

Technical Problem

The present invention relates to an authentication system and method using a flash of a smart mobile, and more specifically relates to an authentication system and method using a flash of a smart mobile capable of authentication by transmitting data through light emitted from a flash of a smart mobile thereby enhancing security and safety in comparison with other authentication systems such as ID, password, official certification, OTP and so on.

Other objects of the present invention are understood through features of the present invention, known from embodiments of the present invention, and embodied by means described in claims and combination thereof.

Solution to Problem

To solve the above problems, the present invention includes technical features as follows.

An authentication system using a flash of a smart mobile according to the present invention includes a smart mobile having a flash which emits light; a light receiver receiving light emitted from the smart mobile to convert into data; and an authentication server generating authentication information from the data and transmitting to the smart mobile.

An authentication system using a flash of a smart mobile according to the present invention may further include a recognition module recognizing which light among a plurality of lights emitted from the smart mobile is to be received.

An authentication system using a flash of a smart mobile according to the present invention may further include a selection module selecting a light from the smart mobile among a plurality of lights emitted in the same space with the light of from the smart mobile.

In an authentication system using a flash of a smart mobile according to the present invention, the light emitted from the smart mobile is formed in one-time.

In an authentication system using a flash of a smart mobile according to the present invention, emission speed and frequency of the light emitted from the smart mobile may be controllable.

In an authentication system using a flash of a smart mobile according to the present invention, emission range of the light emitted from the smart mobile may be controllable.

In an authentication system using a flash of a smart mobile according to the present invention, emission distance of the light emitted from the smart mobile may be controllable.

In an authentication system using a flash of a smart mobile according to the present invention, the light receiver may be formed into one of a credit card, a bank or a member store.

In an authentication system using a flash of a smart mobile according to the present invention, the authentication server may be applicable to an authentication for a transaction or an authentication for a person.

An authentication method using a flash of a smart mobile according to the present invention includes a step of emitting light using a flash equipped to a smart mobile; a step of receiving a light emitted from the smart mobile to convert into data; and a step of receiving a data converted by the receiver to generate the data into authentication information and transmit to the smart mobile, in an authentication server.

An authentication method using a flash of a smart mobile according to the present invention may further include a recognition module recognizing which light among a plurality of lights emitted from the smart mobile is to be received.

An authentication method using a flash of a smart mobile according to the present invention may further include a selection module selecting a light from the smart mobile among a plurality of lights emitted in the same space with the light of from the smart mobile.

In an authentication method using a flash of a smart mobile according to the present invention, the light emitted from the smart mobile may be formed in one-time.

In an authentication method using a flash of a smart mobile according to the present invention, emission speed and frequency of the light emitted from the smart mobile may be controllable.

Advantageous Effects of Invention

Since the present invention is capable of authentication by transmitting through light emitted from a flash of a smart mobile according to foregoing solution of the problem, security and stability can be improved in comparison with other authentication systems such as an ID, a password, a public authentication which are necessary to a bank task, a personal authentication, an identity authentication and a transaction remittance.

And, even if the smart mobile is lost or a stranger acquiring this are misappropriating, cryptography such as patterns cannot be solved thereby it is not available.

Further, carrying is easy to use anywhere regardless of the place because the transaction is available using a flash equipped to the smart mobile.

Other effects of the present invention are understood through features of the present invention, are known from examples of the present invention, and are demonstrated by means shown in claims and combination thereof.

BRIEF DESCRIPTION OF DRAWINGS

FIG. 1 is a perspective view of an embodiment of the authentication system using a flash of a smart mobile according to the present invention.

FIG. 2 is a block diagram illustrating a state of adding a recognition module and a selection module.

FIG. 3 is a flow chart of an embodiment of the authentication method using a flash of a smart mobile according to the present invention.

100: Authentication system using flash of smart mobile
110: Smart mobile
120: Light receiver
130: Authentication server
140: Recognition module
150: section module
S100: Method of authentication using flash of smart mobile
S110: Step of emitting
S120: Step of light receiving
S130: Step of authenticating
S140: Step of recognizing
S150: Step of selecting

MODE FOR THE INVENTION

The following specifications of the present invention are referring to accompanying drawings which illustrate a specific example implementing the present invention. These embodiments are described in more detail enough to let those skilled in the art implement the present invention. The various embodiments of the present invention are different to each other, however, it is understood that those are not exclusive each other. For example, specific forms, structures and features described herein may be achieved in other embodiments without departing from the spirits and the scopes of the technology concept of the present invention. Further, the location and arrangement of each element in each embodiment described herein may be modified without departing from the concepts and the scopes of the present invention. Therefore, the following specifications are not adopted with restricted meaning, and the scopes of the inventive concept are only limited by whole scopes equivalent to insistence of claims and accompanying claims. The similar reference numbers in drawings refer the same or similar functions in various aspects.

FIG. 1 is a perspective view of an embodiment of the authentication system using a flash of a smart mobile according to the present invention. And FIG. 2 is a block diagram illustrating a state of adding a recognition module and a selection module.

An authentication system 100 using a flash of a smart mobile according to the present invention, as shown in FIG. 1 and FIG. 2, includes a smart mobile 110, a light receiver 120, and an authentication server 130.

The smart mobile 110 is generally equipped with a flash emitting light on a rear side of the smart mobile 110.

The smart mobile 110 is a device which is capable of wireless connection with the other party in anytime and anywhere to exchange information while moving, and is a mobile phone capable of at least third generation communication, a tablet PC, a PDA, a PMP and so on.

The smart mobile 110 is referring to a mobile phone conventionally, the mobile phone has various function such as transmitting/receiving text messages, a voice communication, a data communication by accessing the Web.

The present invention is a next generation wireless communication technology using light emitted from a flash of a smart mobile 110, being improved in security and stability in comparison with other authentication systems such as an ID, a password, a public authentication which are necessary to a bank task, a personal authentication, an identity authentication and a transaction remittance.

As light emitted from the flash of the smart mobile 110 is transmitted by data communication to be authenticated, the flash of the smart mobile 110 can be used as an optical communication device such as a Li-Fi which is highlighted as next generation wireless communication technology using light.

The Li-Fi (Light-Fidelity) is a technology in which unlimited Internet shared Wi-Fi technology is merged with the flash of the smart mobile 110, i.e., high efficient illumination LED technology.

The smart mobile 110 can data communication under LED illuminance in which the light emitted from the flash is not visible to the naked eye, and can be used at an area sensitive to radio interference such as an airplane or a nuclear power plant.

As the smart mobile 100 capable of data communication uses a flash equipped to the smart mobile 110, an additional device is not necessary and this is not harmful to a human body in comparison to other wire/wireless optical communication technologies.

The light emitted from the smart mobile 110 is formed in one-time. Studying more carefully, the one-time is represented in a different way into a one-time password generator which is for consolidating security against financial hacking, smishing or pharming.

The one-time password generator is a security system which is used just at a session of each login time, has purpose for preventing password stolen which may be occurring by reusing repeatedly same password.

It is impossible to reuse because a password called by hash based on unidirectional cryptography in difference with conventional password is used and it is disused after the session, and then it can prevent a surreptitious use even if it was lost.

The light emitted from the smart mobile (110) can be controllable in speed and frequency. This is same as the concept of the one-time or one-time password as describe above, it is impossible to use surreptitiously by the other person even if the smart mobile 110 is lost, and a financial task, a transaction task and personal authentication task can be processed in safe.

The present invention is used as a powerful device by supplementing a financial task or personal authentication task through foregoing one-time or one-time password and through adjusting emitting light speed and frequency.

The light emitted from the smart mobile 110 is blink at least 60 ps per a second. This is a frequency for a human being to recognize naturally.

The smart mobile 100 can control emission range of the emitting light. These can be recognized even if the light to a transaction transmitted from the authentication server 130 or personal authentication information that will be described below is not emitted in an accurate range but emitted around there.

The smart mobile 110 can control emission distance of the emitting light. These can be recognized even if the light emitted to the authentication information transmitted from the authentication server 130 is just arrived in a predetermined distance.

The light receiver 120 receives light emitted from the smart mobile 110 to convert into data. Specifically, the light emitted from the smart mobile 110 can be converted into data for programing by using wavelength of the light in the light receiver 120.

The light receiver 120 may be formed into at least one of a credit card, a bank or a member store. The member store is generally a department store, a cafeteria, a restaurant, a hotel, a golf link, a travel bureau or a gas station.

The authentication server 130 receives data converted at the light receiver 120 to generate authentication information from the data and transmit to the smart mobile 110

The authentication server 130 is a system generated for ascertaining transmitted data which is converted at the light receiver 120 to certify and approve a transaction or not, or an person or not.

The authentication server 130 is applied to authentication for a transaction or a person.

The authentication server 130 transmits the generated authentication information to the smart mobile 110 in a form of message to activate on a display; thereby the authentication information is outputted on the display of the smart mobile 110.

The authentication server 130 transmits the authentication information to the smart mobile 110 and stores the authentication in temporary, simultaneously. This is preparation for the situation that the authentication information is not transmitted normally when the authentication information is transmitted from the authentication server to the smart mobile 110.

After confirming the authentication information transmitted to the smart mobile 110, the flash of the smart mobile 110 is emitted to complete a transaction or personal authentication.

If the transaction or personal authentication is confirmed by emitting the flash of the smart mobile 110, the authentication server 130 transmit information of transaction completion or person identification to the smart mobile 110 and the light receiver 120.

The recognition module 140 recognizes receiving data from which light among a plurality of lights emitted through the smart mobile 110. Specifically, the recognition module 140 recognizes a light for transmitting data among lights emitted from the smart mobile 110 that is emitted for taking a picture or a movie, or for lightening a dark place such that the error caused by a plurality of lights can be minimized.

The selection module 150 selects a light from the smart mobile 110 among a plurality of lights emitted in the same place with the light emitted from the smart mobile 110. The selection module 150 selects a light (it means data) emitted from the smart mobile 110 among a plurality of lights that is emitted in the same place with the light emitted from the smart mobile 110, and that is a fluorescent lamp or a bedroom lamp in case of indoor, or a street lamp or luminescent lamp in case of outdoor.

The selection module 150 prevent the light of the smart module 110 with data from interfering with other light emitted in the same place with the light emitted from the smart mobile 110 such as a fluorescent lamp or a bedroom lamp in case of indoor, or a street lamp or luminescent lamp in case of outdoor.

Although the authentication system of the present invention illustrates the transaction or personal authentication by using the light of the flash equipped to the smart mobile 110, anything capable of authenticating the transaction and person, even if sound such as high frequency wave can be used in the authentication.

Exemplary embodiment of the authentication method using a flash of the smart mobile according to the present invention will now be described more specifically with reference to drawings appended herein FIG. 3 is a flow chart of an embodiment of the authentication method using a flash of a smart mobile according to the present invention.

An authentication method S100 using a flash of a smart mobile according to the present invention, as shown in FIG. 3, includes a step S110 of emitting light using a flash equipped to a smart mobile; a step S120 of receiving a light emitted from the smart mobile to convert into data; and a step S130 of receiving a data converted by the receiver to transmit a authentication information which is generated by affirmation and identifying the data to the smart mobile, in an authentication server.

The step of emitting S110 emits light using a flash equipped to the smart mobile 110.

The present invention is a next generation wireless communication technology using light emitted from a flash of a smart mobile 110, is improved in security and stability in comparison with other authentication systems such as an ID, a password, a public authentication which are necessary to a bank task, a personal authentication, an identity authentication and a transaction remittance.

As light emitted from the flash of the smart mobile 110 is transmitted by data communication to be authenticated, the flash of the smart mobile 110 can be used as an optical communication device such as a Li-Fi which is highlighted as next generation wireless communication technology using light.

The smart mobile 110 can data communication under LED illuminance in which the light emitted from the flash is not visible to the naked eye, and can be used at an area sensitive to radio interference such as an airplane or a nuclear power plant.

The light emitted from the smart mobile 110 is formed in one-time. Studying more carefully, describing in other expression, it is temporary password generator by which security is reinforced against a financial hacking, a smishing or a pharming, using a one-time password.

The one-time password generator is a security system which is used just at a session of each login time, and prevents password stolen which may be occurring by reusing repeatedly same password.

It is impossible to reuse because a password called by hash based on unidirectional cryptography in difference with conventional password is used and it is disused after the session, and then it can prevent a surreptitious use who has known the password illegally even if it was lost.

The light emitted from the smart mobile (110) can be controllable in speed and frequency. This is same as the concept of the one-time or one-time password as describe above, it is impossible to use surreptitiously by the other person even if the smart mobile 110 is lost, and a financial task or personal authentication task can be processed in safe.

The smart mobile 110 can control an emitting range and distance of the emitting light. These can be recognized even if the light to a transaction transmitted from the authentication server 130 or personal authentication information is just emitted in a predetermined range.

The step of receiving light receives the light emitted from the smart mobile 110 at the light receiver 120 receives to convert into data. Specifically, the light emitted from the smart mobile 110 can be converted into data for programing using wavelength of the light in the light receiver 120.

The step of authenticating S130 receives data converted at the light receiver 120 to generate authentication information from the data and transmit to the smart mobile 110

The authentication server 130 is a system generated for ascertains transmitted data which is converted at the light receiver 120 to certify and approve a transaction or not, or an person or not.

The authentication server 130 is applied to authentication for a transaction or a person.

The authentication server 130 transmits the generated authentication information to the smart mobile 110 in a message to activate on a display; thereby the authentication information is outputted on the display of the smart mobile 110.

The authentication server 130 transmits the authentication information to the smart mobile 110 and temporary stores the authentication, simultaneously. This is preparation for the situation that the authentication information is not transmitted normally when the authentication information is transmitted from the authentication server to the smart mobile 110.

The step of recognizing S140 recognizes receiving data from which light among a plurality of lights emitted through the smart mobile 110. Specifically, the recognition module 140 recognizes a light for transmitting data among lights emitted from the smart mobile 110 that is emitted for taking a picture or a movie, or for lightening a dark place such that the error caused by a plurality of lights can be minimized.

The step of selecting selects a light from the smart mobile 110 among a plurality of lights emitted in the same place with the light emitted from the smart mobile 110.

The selection module 150 selects a light (it means data) emitted from the smart mobile 110 among a plurality of lights that is emitted in the same place with the light emitted from the smart mobile 110, and that is a fluorescent lamp or a bedroom lamp in case of indoor, or a street lamp or luminescent lamp in case of outdoor.

The selection module 150 prevent the light of the smart module 110 with data from interfering with other light emitted in the same place with the light emitted from the smart mobile 110 such as a fluorescent lamp or a bedroom lamp in case of indoor, or a street lamp or luminescent lamp in case of outdoor.

The above describes the present invention in accordance with an exemplary embodiment, however, it will be clarified to those skilled in the art that various changes and modifications can be implemented in scope of claims, and those changes and modifications belongs the scope of accompanying claims.

The invention claimed is:

1. An authentication system comprising:
   a smart mobile terminal having a flash which emits light;
   a light receiver receiving the light emitted from the smart mobile terminal and converting the received light to data; and
   an authentication server generating authentication information from the data received from the light receiver and transmitting the authentication information to the smart mobile terminal,
   wherein the light emitted from the smart mobile terminal is for one-time use such that the light is used as a one-time password that is discarded after the light is used to generate the authentication information, and
   wherein a speed and a number of light emission from the flash of the smart mobile terminal are controlled such that light is emitted differently each time when the light is emitted from the flash of the smart mobile terminal for authentication.

2. The authentication system of claim 1, further comprising:
   a recognition module recognizing the light convertible to the data among a plurality of lights emitted from the smart mobile terminal such that the recognized light is received by the light receiver,
   wherein the plurality of lights comprise light used for capturing a picture or moving picture or light used for lighting up a dark place.

3. The authentication system of claim 1, further comprising:
   a selection module selecting the light emitted from the smart mobile terminal among a plurality of lights comprising lights emitted from sources other than the smart mobile terminal.

4. The authentication system of claim 1, wherein an emission range of the light emitted from the smart mobile terminal is controllable.

5. The authentication system of claim 1, wherein an emission distance of the light emitted from the smart mobile terminal is controllable.

6. The authentication system of claim 1, wherein the light receiver is associated with one of a credit card, a bank or a member store.

7. The authentication system of claim 1, wherein the authentication server is applicable to an authentication for a transaction or an authentication for a person.

8. A method of authentication using a flash of a smart mobile terminal, the method comprising:

emitting light, by the flash;

receiving, by a light receiver, the light emitted from the smart mobile terminal and converting the received light to data; and receiving, by an authentication server, the data from the light receiver; and generating, by the authentication server, authentication information from the received data and transmitting the authentication information to the smart mobile terminal, wherein the light emitted from the smart mobile terminal is for one-time use such that the light is used as a one-time password that is discarded after the light is used to generate the authentication information, and wherein a speed and a number of light emission from the flash of the smart mobile terminal are controlled such that light is emitted differently each time when the light is emitted from the flash of the smart mobile terminal for authentication.

9. The method of claim 8, further comprising:

recognizing the light convertible to the data among a plurality of lights emitted from the smart mobile terminal such that the recognized light is received by the light receiver, wherein the plurality of lights comprise light used for capturing a picture or moving picture or light used for lighting up a dark place.

10. The method of claim 8, further comprising:

selecting the light emitted from the smart mobile terminal among a plurality of lights comprising lights emitted from sources other than the smart mobile terminal.

11. An authentication system comprising:

a smart mobile terminal having a flash which emits light;

a light receiver receiving the light emitted from the smart mobile terminal and converting the received light to data;

an authentication server generating authentication information from the data received from the light receiver and transmitting the authentication information to the smart mobile terminal;

a recognition module recognizing the light convertible to the data among a plurality of lights emitted from the smart mobile terminal such that the recognized light is received by the light receiver; and a selection module selecting the light emitted from the smart mobile terminal among a plurality of lights comprising lights emitted from sources other than the smart mobile terminal.

* * * * *